Jan. 11, 1966  I. J. VOULLAIRE  3,228,513
METHOD AND APPARATUS FOR FEEDING FRUIT IN MECHANICAL
PACKING PROCESSES
Filed July 1, 1963  4 Sheets-Sheet 2
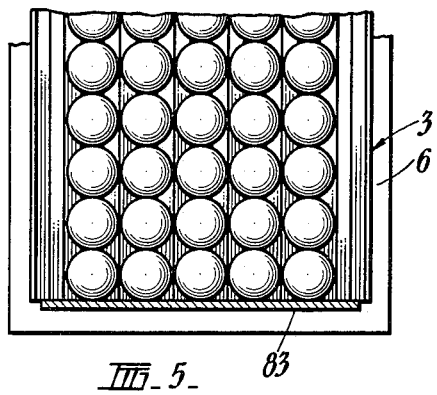
FIG_5_
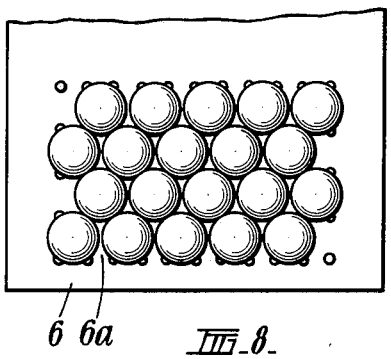
FIG_8_
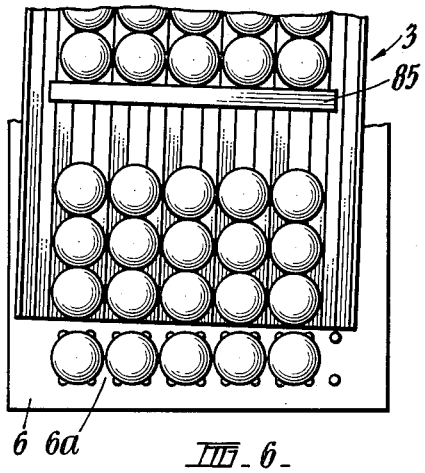
FIG_6_
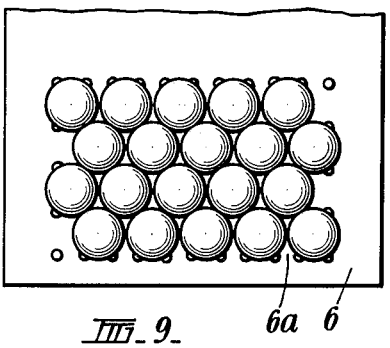
FIG_9_
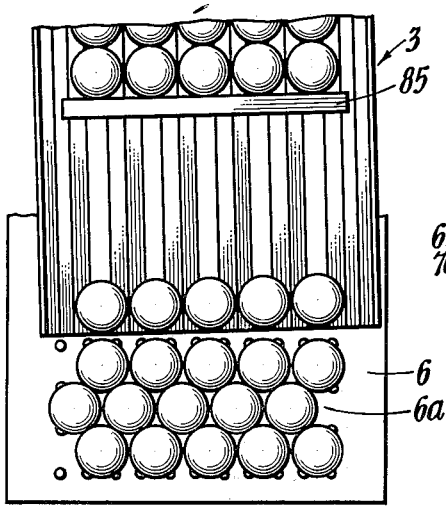
FIG_7_
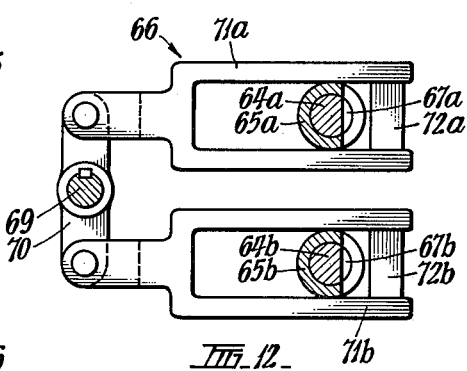
FIG_12_

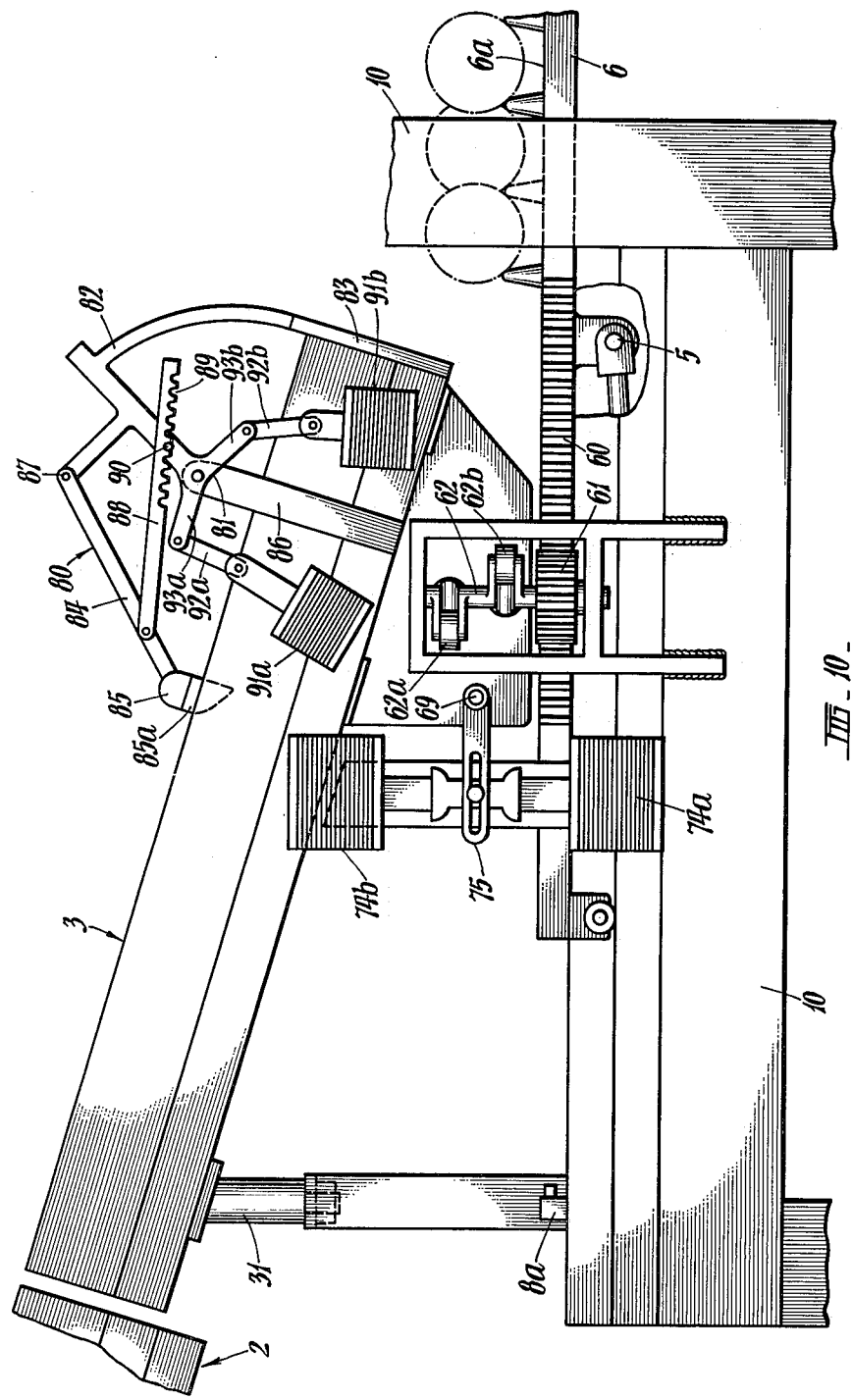

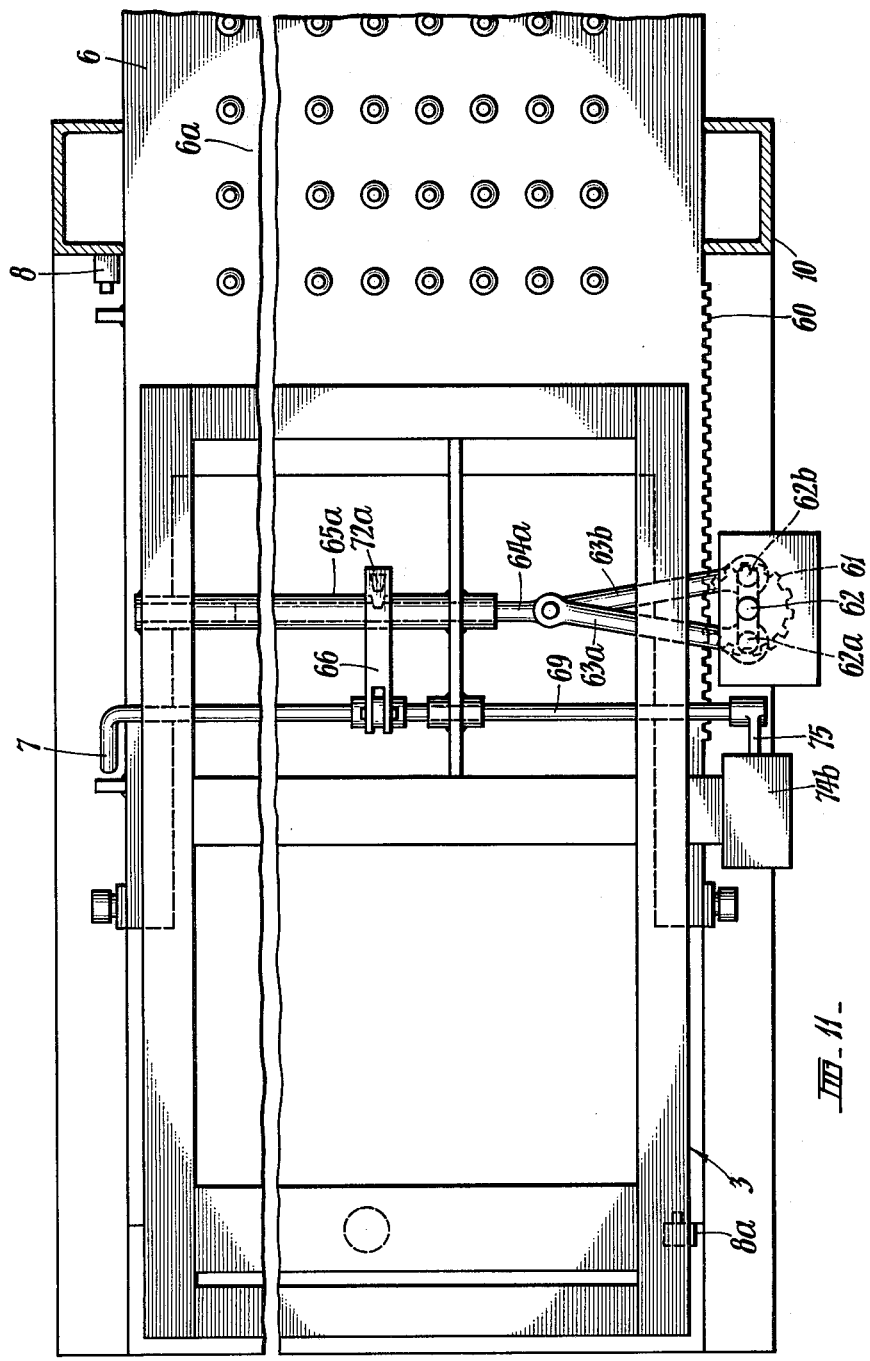

United States Patent Office
3,228,513
Patented Jan. 11, 1966

3,228,513
METHOD AND APPARATUS FOR FEEDING FRUIT IN MECHANICAL PACKING PROCESSES
Izak Johannes Voullaire, Mildura, Victoria, Australia
Filed July 1, 1963, Ser. No. 291,840
Claims priority, application Australia, July 5, 1962, 19,672/62
11 Claims. (Cl. 198—30)

This invention relates to the art of mechanically packing fruit in cases and more particularly to a method and apparatus for feeding fruit so as to form a layer of fruit in predetermined row formation.

It is customary in the present practice governing the packing of citrus fruits in many countries that each layer of fruit shall be made up of a number of transverse rows each containing a given number of pieces of fruit, and having alternate transverse rows in substantial longitudinal alignment while successive rows are staggered relative to one another by an amount approximately equal to half the diameter of the fruit. The practice also requires that the rows of fruit in one layer are staggered by a similar amount in relation to the row immediately below it. Thus successive layers are not quite identical but are complementary to one another, the pieces of fruit in each layer corresponding with the intervals between the fruit in the prior and succeeding layers.

By arranging the rows and layers of fruit in this manner the most economic use of the cubic capacity of the fruit case is obtained. This arrangement also gives a degree of interlocking between the layers of fruit and thus reduces the possibility of damage to the fruit by movement within the case during transit.

It will be understood that the cases used for this purpose are standardized, having predetermined basic dimensions which constitute the dimensions of each layer of fruit.

Machines for mechanically packing fruit in cases without the use of manual labour are known, an example of which is disclosed in the specification of my U.S. Patent No. 2,938,315. Initial feeding of the fruit in a satisfactory manner has, however, presented difficulties in such machines and it is an objective of the present invention to provide an improved mechanical method and means for feeding fruit so as to achieve the layered packing of the fruit in the desired progressive row formation comparable with the packing achieved by manual labour.

Now I have discovered that by cascading a quantity of fruit onto a corrugated surface inclined at a suitable angle, the individual pieces of fruit quickly find there way to the troughs of the corrugations and roll off the lower end of the inclined surface in a series of directed streams. If the spacing of the corrugations corresponds with the spacing of the pieces of fruit in a row of fruit in the required row formation, the fruit will leave the surface in that formation. Preferably control means is applied to the fruit leaving the corrugated surface and correlated with an area, such as a tray, upon which the fruit is deposited, by which means a feeding device for producing layers of fruit with the fruit in predetermined row formation is achieved.

The invention includes the method of mechanically feeding fruit to an area in predetermined row formation comprising the steps of supplying a quantity of fruit to an inclined corrugated surface in the form of a ramp, the troughs of the corrugations extending ramp-wise and down which the pieces of fruit can roll, the spacing of the troughs of the corrugations corresponding with the spacing of the pieces of fruit in a row of fruit to be formed, and locating the said area beneath the lower end of the said ramp so that the flow-off of fruit therefrom is deposited in the said area in the predetermined row formation.

Preferably the method includes the step of controlling the flow-off of fruit so that a row of pieces of fruit is released simultaneously from the said lower end and received onto the said area, succeeding rows being received in juxtaposed relation to form a required layer of fruit.

In the preferred arrangement, the area upon which the rows of fruit are deposited is provided with upstanding projections disposed at appropriate intervals so as to assist in locating and retaining the fruit in correct row formation.

In the preferred construction of the invention, a hopper is disposed at the upper end of the inclined corrugated surface or ramp, which latter is composed of two distinct sections, namely, an intermediate agitator section, and a distributor section disposed at the lower end.

One practical arrangement of the invention will now be described with reference to the accompanying drawings, in which:

FIGURES 5, 6 and 7 are plan views of the end of the distributor portion of the ramp showing the distributor in the neutral position, left hand and right hand laying positions respectively.

FIGURES 8 and 9 are plan views of a layer of fruit when laid according to a left hand pattern and a right hand pattern respectively.

FIGURE 10 is a side elevation of the distributor and essential related mechanisms.

FIGURE 11 is a plan view of FIGURE 10 with much of the distributor cut away to disclose the distributor actuating mechanism.

FIGURE 12 is a side elevation on an enlarged scale of a detail of the distributor actuating mechanism.

Figure 1:
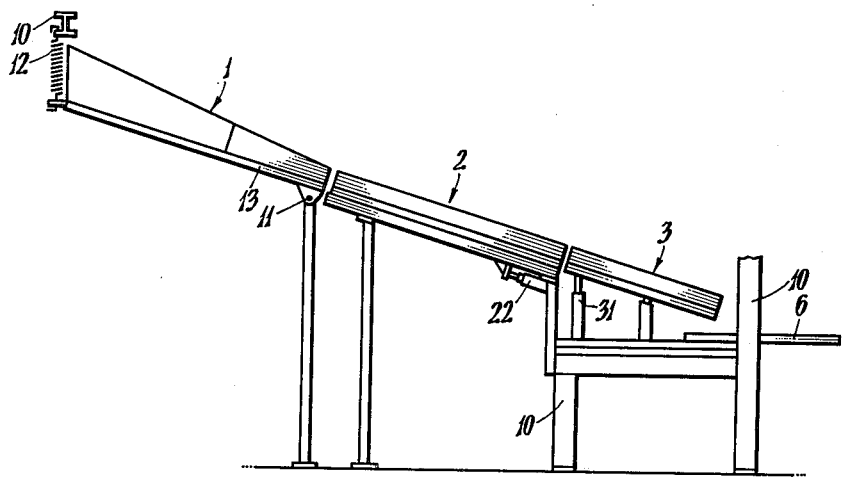
FIGURE 1 is a schematic side elevation of the ramp arrangement of the fruit feeding apparatus according to the invention.

Referring to the drawings, FIGURE 1 shows schematically the basic arrangement of the hopper and the inclined corrugated surface, or ramp, which, for practical reasons, are constructed as three separate parts, viz, the hopper 1, an agitator 2, and a distributor 3, all mounted individually upon the frame 10 of the parent machine.

The hopper 1 is supported at its lower end by a horizontal hinge 11, and resiliently suspended at its upper end by springs 12.

When fully loaded the springs 12 deflect, reducing the angle of slope of the hopper floor 13. As the fruit is fed to the packing machine, the load on the hopper is reduced and the resiling springs 12 increase the gradient of the hopper floor 13, thus maintaining the flow of fruit.

From the hopper 1 the fruit flows to the agitator 2, which is mounted upon the frame 10 so as to be capable of a small amount of reciprocating motion in a longitudinal direction.

Figure 2:
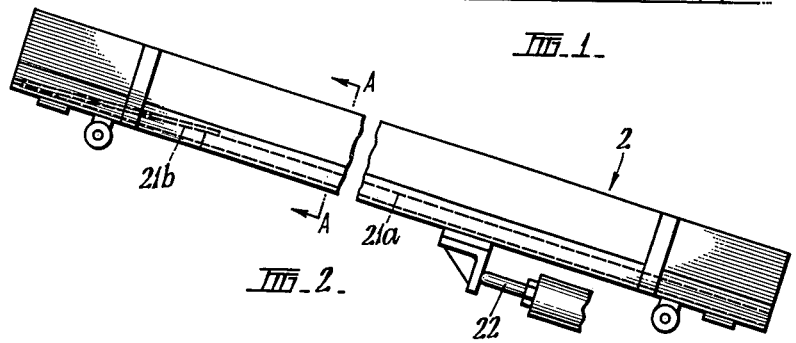
FIGURES 2 and 3 are elevation and plan views respectively of the agitator portion of the ramp.
Figure 3:
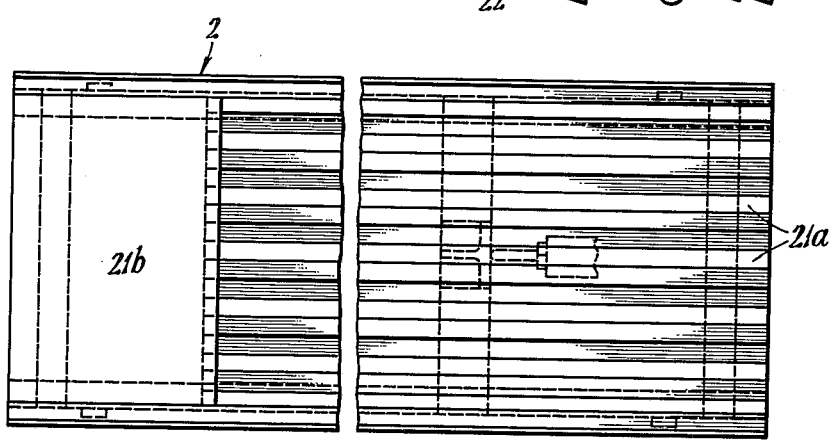
Figure 4:
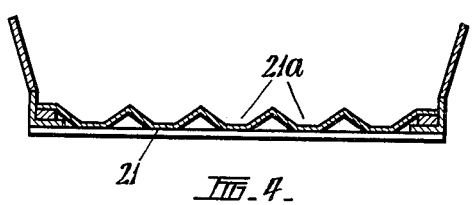
FIGURE 4 is a cross section taken on the line A—A of FIGURE 2.

The function of this component is to align the fruit in longitudinal rows and to this end the greater part at least of the surface of the agitator floor 21 is corrugated in longitudinal troughs and ridges as shown in more detail in FIGURES 2, 3 and 4. The spacing of the troughs 21a of the corrugations corresponds with the spacing of the pieces of fruit in a row of fruit to be formed. (In the example taken there are five pieces of fruit in a row.)

The fruit enters the agitator 2 from the hopper 1 in a random fashion and the bulk of it flows in the five troughs down the slope. However, numerous pieces of fruit over-ride the basic rows, some even resting temporarily upon the ridges; this would tend to interfere with the smooth operation of the feeding device.

To overcome this, and to induce downward flow of the fruit in troughs, the agitator receives a sudden longitudinal displacement, or impulse, of the order of about ¾ of an inch, from a pneumatic ram 22, each time the fruit is required to roll forward into a batching device disposed at the lower end of the distributor 3, and described in detail hereinafter. Thus, the flow of fruit in the agitator and distributor is not continuous but intermittent, i.e. "stop" and "go."

In the preferred arrangement the agitator floor 21 has a plain ramp portion 21b at its upper end and is disposed to slope at a gradient of 1 in 4, where oranges are the fruit being treated.

This gradient may vary slightly according to the particular fruit concerned. In practice, the ideal angle of inclination is one in which the fruit concerned is reluctant to move without the sudden longitudinal displacement or impulse of the agitator above referred to, which impulse initiates positive rolling movement of the fruit down the incline.

The reluctant movement of the fruit at "go" results in effective longitudinal alignment because the accelerated movement due to the weight of a fruit situated at the ridge of a corrugation, becomes greater than the accelerated movement of the fruit in the rough of the corrugation, thereby assuring that all the fruit moves into the troughs before reaching the approach to the batching device.

The distributor 3 is mounted upon the frame 10 so as to be oscillatable about the vertical pivot 31, the degree of oscillation amounting to approximately half the diameter of a piece of fruit.

Beneath the lower end of the distributor 3, there is located an intermittently moving tray 6, providing the area 6a upon which the rows of fruit are deposited.

The distributor feeds the fruit onto the tray 6 in two different patterns, best seen in FIGURES 6 and 7. To lay a left hand pattern the distributor is first displaced to the left (FIGURE 6) and to lay a right hand pattern the distributor is first displaced to the right (FIGURE 7). A complete left hand pattern is shown in FIGURE 8, and a complete right hand pattern is shown in FIGURE 9.

Referring now to FIGURES 10 and 11, the oscillation of the distributor is correlated with intermittent longitudinal movement of the tray 6, which latter is moved backwards and forwards in a horizontal plane by means of a double-acting pneumatic ram, indicated in part only at 5. The intermittent movement of the tray 6 is so controlled that a flow-off of a complete row of pieces of fruit from the batching device occurs simultaneously with the locating of the tray area 6a in the required position to receive that row, the tray being advanced in stages a distance equivalent to the spacing of the rows of fruit in a layer.

To achieve this, the tray 6 is provided with a toothed rack 60, which engages with a pinion 61. The pinion 61 is fixedly mounted at the lower end of a vertical shaft 62, which shaft is rotatably mounted in the frame 10, and has two opposed cranks 62a and 62b set at 180°. Connecting rods 63a and 63b connect the cranks 62a and 62b respectively to push rods 64a and 64b disposed inside tubes 65a and 65b respectively, these tubes being attached to the distributor 3, as best seen in FIGURES 11 and 12.

The upper crank 62a is arranged to throw the distributor 3 firstly to the right and the lower crank 62b is arranged to throw the distributor firstly to the left, upon engagement of a clutch 66 with respectively a notch 67a in the rod 64a or a notch 67b in the rod 64b (FIGURE 12).

The clutch 66 is operated by a clutch shaft 69, mounted in the frame 10 for partial rotation, causing oscillation of the clutch arm 70 in a vertical plane, whereby clutch toggles 71a and 71b are movable horizontally in opposite directions in predetermined sequence. Clutch toggle 71a has a dog 72a arranged to engage the notch 67a upon the arm 70 being partially rotated in an anti-clockwise direction, whilst clutch toggle 71b has a dog 72b arranged to engage that notch 67b upon the arm 70 being partially rotated in a clockwise direction (as viewed in FIGURE 12), it being understood that the tubes 65a and 65b have corresponding cut-away portions respectively allowing such clutch dog engagement. A neutral position is arrived at when the arm 70 is vertical, as in FIGURE 12, when both the dogs 72a and 72b are disengaged from the notches 67a and 67b respectively.

It will be seen that when clutch dog 72a engages notch 67a the rod 64a is locked to the tube 65a, so that forward movement of the rack 60 will cause the distributor 3 to move to the right (as viewed from the front of the machine) i.e. to the position shown in FIGURE 7, whereas when clutch dog 62b engages notch 67b, the rod 64b is locked to the tube 65b, so that forward movement of the rack 60 will cause the distributor 3 to move to the left, i.e., to the position shown in FIGURE 6. It is also clear that the clutch 66 must move laterally with the distributor 3 and to provide for this the clutch 66 is slidable axially upon the shaft 69, whilst being partially rotatable thereby or alternatively the shaft 69 may be arranged to move axially in unison with the clutch.

The operation of the clutch 66 is conveniently by means of two solenoids 74a and 74b actuating a lever 75 keyed to the shaft 69. The solenoids 74a, 74b are energized from a master controller (not shown), energization of solenoid 74a engaging the upper crank 62a with the distributor 3 to lay a right hand pattern, and energization of solenoid 74b engaging the lower crank 62b with the distributor 3 to lay a left hand pattern.

The control is so co-ordinated with the tray area 6a that as the tray 6 and rack 60 commence to move forward rotating the pinion 61 and reciprocating the rods 64a, 64b, the clutch is brought into engagement with either notch 67a or notch 67b, according to whether a right hand pattern or a left hand pattern of fruit is to be produced.

Considering now the batching device disposed at the lower end of the distributor 3, this device is shown in detail in FIGURE 10 and indicated generally by the numeral 80.

It consists essentially of a rocker beam 81 having at each end a front arm 82 supporting a gate 83, and a rear arm 84 supporting a segregator bar 85. The rocker beam 81 is mounted for rocking action in brackets 86 rigid with the distributor 3 so that the beam 81, the gate 83 and the bar 85 all lie transversely to the longitudinally axis of the distributor 3. The relative disposition of the gate 83 and the bar 85 is such that when the gate is closed, i.e. preventing the flow-off of fruit from the distributor 3 to the tray 6, bar 85 is raised clear of the fruit in the upper part of the distributor thereby allowing the fruit to roll into the batching device. This is the "go" position for the fruit on the ramp but the "off" position for the batching device. It is shown in FIGURE 10.

In the "on" position (equivalent to the "stop" position for the rest of the fruit on the ramp) the gate 83 is raised free of the fruit and the bar 85 is lowered into the lines of fruit in the troughs of the distributor, barring further progress, and separating the required number of rows of fruit for one layer, which are then able to roll forward for distribution upon the tray 6 in accordance with the oscillations of the distributor 3, as above described. The segregator bar 85 may have a padded surface 85a to avoid bruising of the fruit.

The span of the batching device, to accommodate different size fruit and/or a different number of rows in a layer, is adjustable by articulating the arms 84 at 87 and locking them in the required position by a latch 88 at each side having notches 89 engaging with a pin 90 fixed on a part of each arm 82.

Rocking operation of the beam 81 to effect the "on" and "off" positions of the batching device 80, is by solenoids 91a and 91b, through links 92a, 92b and arms 93a, 93b, the latter being rigid with the rocker beam 81. The control of the solenoids 91a, 91b, is from the master controller in co-ordinated sequence.

When a layer of fruit has flowed from the distributor 3 onto the tray area 6a, a trip device attached to the tray 6, and indicated schematically at 7, throws the clutch 66 to the neutral position and centers the distributor (as in FIGURE 5), whilst simultaneously a limit switch 8 de-energizes the solenoids 74a, 74b.

The pneumatic ram 5 is then actuated to move the tray 6 to a pick-up station and subsequently return it empty to the initial position to repeat the cycle.

During the pick-up operation of the layer of fruit, the solenoid 91b actuates the batching device 80 to the "off" position, i.e. closes the gate 83 and raises the bar 85. Simultaneously the pneumatic ram 22 is actuated to impart a pulse to the agitator 2 causing a sudden longitudinal displacement thereof in the opposite direction to the flow line of the fruit, thereby assisting to promote the flow of fruit on the up-stream side of the bar 85 into the batching device where it is arrested by the gate 83.

When the empty tray 6 has been returned to its initial position in readiness to receive another layer of fruit, it trips a switch 8a causing the solenoid 91a to actuate the batching device 80 to the "on" position, i.e. lowers the bar 85 to segregate the batch now contained in the batching device, whilst raising the gate 83 to permit distribution of the fruit in rows onto the tray area 6a as hereinbefore described. Simultaneously the appropriate solenoids 74a or 74b is energized to engage the clutch 66 with one of the rods 64a or 64b according to whether a right hand pattern or a left hand pattern is to be laid.

In this regard it will be understood by those conversant with the art, that successive layers of fruit are laid to patterns of opposite hand, i.e. if the first layer is right hand (FIGURE 9) the next layer is left hand (FIGURE 8) and so on. As previously explained the particular "hand" is determined by the position of the first row laid.

Thus if the first row of a layer is to be right handed, the solenoid 74a is energized to engage the clutch dog 72a with the notch 67a in the rod 64a and the tube 65a, thereby oscillating the distribution 3 firstly to the right as the tray 6 with its rack 60 moves forward. Likewise, operation of the solenoid 74b causes the distributor 3 to first oscillate to the left, thus producing a left hand layer.

The various co-ordinated controls are preset in an electronic, or like, master controller programmed for the particular sequence of operations required and directed to the type of fruit to be packed and preferably include a cut-off switch associated with the hopper 1, arranged to stop the machine when the hopper rises to its unloaded position, i.e. when it is empty due to the supply of fruit having ceased.

To accommodate the distribution of fruit of various sizes requiring a change in the number of rows in a layer, the complete assembly of crank shaft 62, pinion 61, connecting rods 63a, 63b, and rods 64a, 64b, may be arranged to be easily removed and replaced by another similar assembly.

For instance, for smaller fruit requiring a greater number of rows per layer the distributor must oscillate with higher frequency and the pinion 61 of the assembly would be correspondingly smaller.

Obviously, the solenoids included in the foregoing description may be replaced by any other suitable actuating means. Likewise, the rams 5 and 22, which are preferably pneumatic, may be hydraulically or electrically operated.

Other practical alterations and adjustments may be made to suit conditions without departing from the broad concept of the invention as defined in the following claims.

I claim:

1. Apparatus for mechanically feeding fruit to an area in predetermined staggered row formation comprising a frame, an inclined ramp mounted on said frame having corrugations therein with the troughs of said corrugations extending longitudinally of said ramp, a hopper for supplying pieces of fruit to the upper end of said ramp down which the pieces of fruit can roll, the spacing of said troughs corresponding with the spacing of the pieces of fruit in a row of fruit to be formed in said area located beneath the lower end of said ramp so that the flow-off of fruit therefrom is deposited in said area in predetermined row formation, said ramp comprising an intermediately disposed agitator producing a periodic agitating pulse, an oscillating distributor located at the lower end of said ramp down-stream of and in direct trough alignment with said agitator, a batching device cooperating with said distributor for controlling said flow-off of fruit, said agitator being independently mounted on said frame for reciprocating pulse movement over a small distance in a longitudinal direction, said distributor being independently mounted on said frame for oscillation about a vertical pivot located at its up-stream end so that alternate rows of fruit released by said batching device at the down-stream end of said distributor flow onto said area in staggered formation, and means simultaneously advancing said area relative to said frame in a direction along the longitudinal flow line of the pieces of fruit to form layers of pieces of fruit.

2. Apparatus according to claim 1, wherein said batching device comprises a rocker beam pivotally mounted for rocking action above said distributor, the rocking axis of said beam being transverse to the longitudinal direction of said ramp, a gate at the down-stream end of said beam and a segregator bar at its up-stream end, said gate and bar being substantially parallel to said rocking axis so that a lowering of said gate closes off the lower end of said distributor thereby preventing a flow-off of fruit, and results in the raising of said segregator bar to allow a batch of fruit to roll into said batching device, and a raising of said gate results in the lowering of said segregator bar preventing the further flow of fruit into said batching device but allowing a flow-off of the batch of fruit in said batching device row by row onto said area, the number of rows in a batch being predetermined by the distance between said gate and said segregator bar.

3. Apparatus according to claim 2, wherein means are provided for adjusting the distance of said segregator bar from said rocking axis whereby the number of rows of fruit in a batch can be varied and/or pieces of fruit of a different general size may be accommodated.

4. Apparatus according to claim 1, wherein said hopper is pivotally mounted on said frame at its down-stream end by a transverse hinge, and resiliently supported at its up-stream end by spring means, whereby loading the hopper loads said spring means and lowers the hopper about said hinge to control the rate of run-off of the pieces of fruit from said hopper, said run-off being maintained substantially constant by the resiling of said spring means as the load decreases.

5. Apparatus according to claim 1, wherein said batching device is solenoid actuated.

6. Apparatus according to claim 1, wherein said distributor is oscillated by means of a crank mechanism controlled by a solenoid operated clutch.

7. Apparatus according to claim 1, wherein means are provided operable by said hopper when empty for stopping said apparatus.

8. Apparatus according to claim 1, wherein said batching device comprises a movable gate that releases a row of pieces of fruit simultaneously from the lower end of said distributor to be received onto said area with succeeding rows being received in juxtaposed relation to form the required layer of pieces of fruit.

9. Apparatus according to claim 1, including means for imparting a pulse to said agitator in the opposite direction to the longitudinal flow line of the pieces of fruit.

10. Apparatus according to claim 1, wherein means are provided for actuating said distributor to lay selectively a right hand pattern or a left hand pattern, said means comprising a shaft having two opposed cranks of equal throw set at 180°, each crank being connected by a separate linkage disposed transversely to the longitudinal length of said distributor, said linkages being selectively engageable with said distributor at a point down-stream of the vertical pivot upon which said distributor is oscillatable, a clutch device to engage either one of said linkages with said distributor while releasing the other of said linkages according to the pattern to be laid, and drive means for rotating said shaft thereby oscillating said distributor about said pivot in proportion to the crank throw, said drive means being associated with the advancement of said area and correlated therewith.

11. Apparatus according to claim 10 wherein said area comprises a reciprocatable tray member having a toothed rack, and wherein said drive means comprises a fluid pressure operated ram arranged to advance and retract said tray member, a toothed pinion fixed on said shaft meshing with said toothed rack to rotate said shaft with advancement of said tray member.

References Cited by the Examiner

UNITED STATES PATENTS

| 862,923 | 8/1907 | Linsley | 221—301 |
| 2,587,740 | 3/1952 | Laughlin | 198—30 |
| 2,847,809 | 8/1958 | Lindeman | 53—160 |
| 2,941,650 | 6/1960 | Clinton. | |

OTHER REFERENCES

German patent application 1,005,442, Mar. 28, 1957.

SAMUEL F. COLEMAN, *Primary Examiner.*

ERNEST A. FALLER, *Examiner.*